R. ELLWOOD & R. L. PITCHER.
CULTIVATOR.
No. 177,063. Patented May 9, 1876.
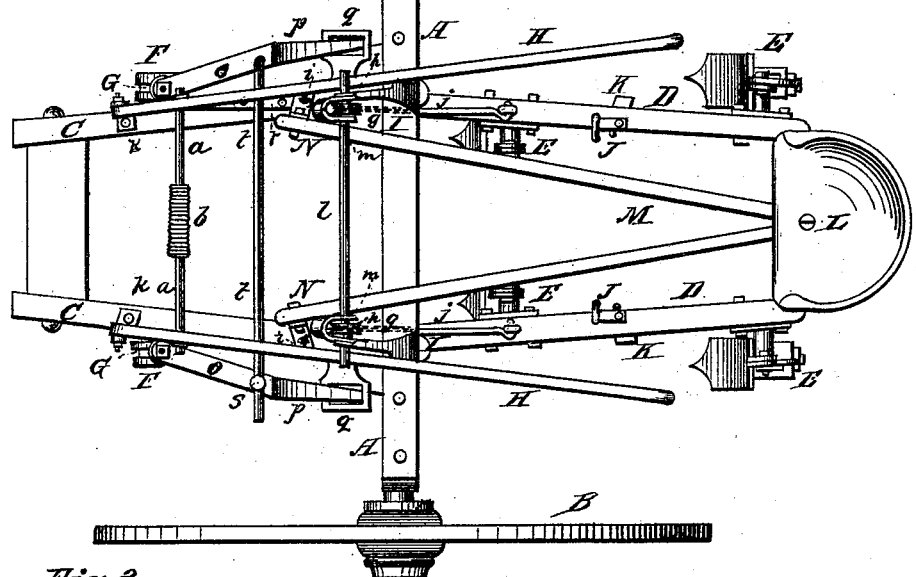
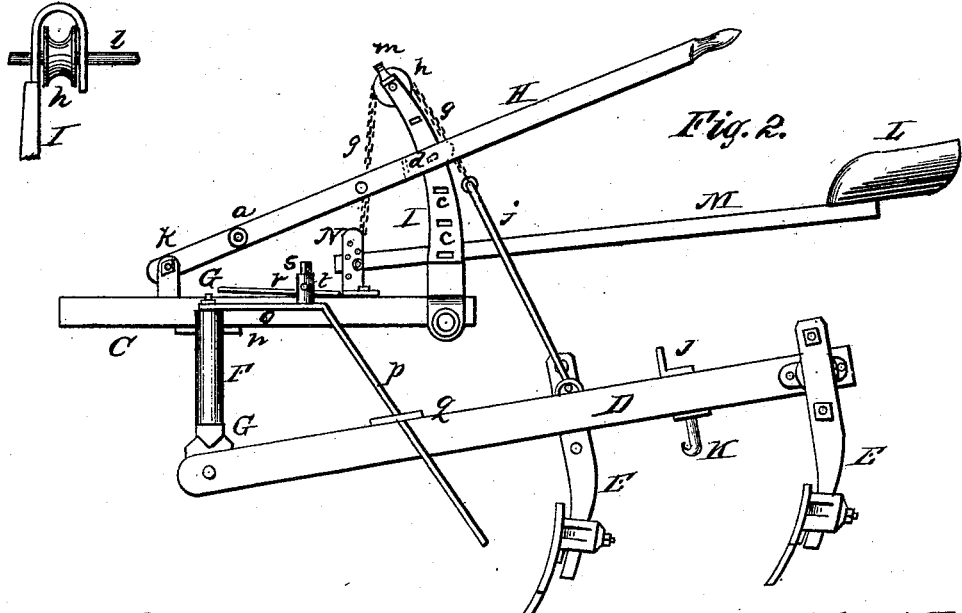
WITNESSES: INVENTORS:
O. W. Bond Reuben Ellwood.
George H. Christy Richard L. Pitcher.
By West & Bond
Attys.

UNITED STATES PATENT OFFICE.

REUBEN ELLWOOD AND RICHARD L. PITCHER, OF SYCAMORE, ILLINOIS; SAID PITCHER ASSIGNOR TO SAID ELLWOOD.

IMPROVEMENT IN CULTIVATORS.

Specification forming part of Letters Patent No. 177,063, dated May 9, 1876; application filed November 17, 1875.

*To all whom it may concern:*

Be it known that we, REUBEN ELLWOOD and RICHARD L. PITCHER, of Sycamore, De Kalb county, State of Illinois, have invented new and useful Improvements in Cultivators, of which the following is a full description, reference being had to the accompanying drawings, in which—

Figure 1 is a top or plan view; Fig. 2, a side elevation, with the wheels removed; Figs. 3 and 4, details.

The nature of this invention consists in an improvement in the device for connecting the drag-bars with the main frame, and moving them separately or in unison, as hereinafter more fully described, and in the devices for elevating the plows above the ground and adjusting their running depth.

In the drawings, A represents the axle; B, the wheels; C, the main frame; D, the drag-bars; E, the plows or shovels, with their standards; F, the cylinders attached to the main frame C; G, the shafts passing through the cylinders; H, the elevating-levers; I, the curved standards; J, the upper foot-rests; K, the lower foot-rests; L, the seat; M, the seat bars or frame; N, the brackets, with a series of holes for adjusting the height of the seat; $a$, the cross-rod for connecting the elevating-levers H; $b$, the interposed spring in said rod; $c$, the openings in the sides of the curved standards; $d$, the pins on the levers H, which engage with the openings; $f$, the guards on the levers H; $g$, the chains for elevating the drag-bars D; $h$, the sheaves, over which the chains $g$ run; $i$, the pins for connecting the ends of the chains $g$ with the levers H; $j$, the rods, forming part of the elevating-chains $g$; $k$, the lever-pivots; $l$, the cross-rod, connecting and bracing the top of the standards I; $m$, the curved top of the standards I; $n$, the brackets, by which the tubes or cylinders F are connected to the main frame C; $o$, the arms, projecting back from the upper ends of the shafts G; $p$, the portion of the arms $o$ bent down; $q$, the brackets on the drag bars or beams, through which the bent portion $p$ of the arms $o$ pass; $r$, the stud on the arm $o$, provided with a hole to receive one end of the rod $t$; $s$, the set-screw, for holding the rod $t$ in the stud $r$; $t$, the cross-rod, connecting the arms $o$ together.

In construction, the axle A may be elevated, as shown, or it may be made in any of the well-known forms. A single tongue may be applied to the frame C, or the bars thereof may be extended so as to form a split tongue, as desired. This part of the machine, as well as the drag-bars, plow-standards, and plows, may be made in any of the well-known forms, which are suitable to operate in connection with our lifting devices.

The curved standards I are made of cast-iron, and may be bolted to the axle A, as shown, or to the frame C. These standards I are made on the arc of a circle having the pivot $k$ for its center, and they are provided with openings $c$ through the sides instead of notches on the edges, as heretofore constructed. These openings $c$ are made oblong, so as not to require any close fitting of the pin $d$.

The levers H are pivoted to the brackets $k$, which brackets are usually made with a slot for the bolt which fastens them to the frame C, so that the pin $d$ may be adjusted forward or back by means of said brackets. The chains $g$ are connected to the levers H by the pins or hooks $i$, and pass up over the sheaves $h$, and are connected with the drag-bars D by means of the rods $j$. The chains $g$, however, if desired, may extend clear to the drag-bars. The length of the chains is adjusted by engaging different links with the pin $i$.

The two standards I are connected together at their upper ends by the rod or bar $l$, which passes through them, and also form the bearing of the sheaves $h$. The upper end of each standard is bent over, as shown at $m$, Fig. 3, so as to form a guide to keep the chain on sheave $h$, and to form braces between the standards and cross-rod $l$, which arrangement connects the upper ends of the standards firmly together, and gives the two standards I four points of support on the cross-rod $l$.

The levers H are connected together near their lower end by a cross-rod, $a$, which is formed, in the middle, into a helical spring, as shown. In constructing them for use, however, it will be found advantageous to make the bar into two sections and connect them together with the central spring. And a modification of this device may be made by the use of additional brackets, so as to attach a separate spring to each lever H. This connecting spring-bar, a, as shown, is located over the pivot k, but its precise location is not material, its office being to press the levers H against the sides of the standards I, so as to keep the pin d engaged with said standards by means of the openings c. By this arrangement we greatly simplify both the construction and operation of the levers H, used for adjusting and lifting the drag-bars, as we entirely avoid the curved rack and spring-pin with bar and handle, which are necessary when a connection is made with the edge of the standard instead of with the side, as here shown. To prevent any unnecessary strain on the spring b, and to keep the levers H in position, they are provided with guards f, shown at Fig. 4, which pass partly around the standards I, and prevent the levers H from being thrown off too far.

In operation the levers H are pushed away from the standards I, which disengages the pins d from the openings c, when the levers can be elevated or depressed, as desired; and when in the position required the spring b will force the pins d into the notches or openings c at the sides of the standards I and hold the levers H in position. The levers may be moved together or separately, as desired.

The drag-bars D are attached to the frame C by means of shafts G, which pass through tubes or cylinders F. The lower end of each shaft G is flattened so as to pass into a mortise in the front end of each drag-bar, and the two are connected together by a pivotal bolt, upon which the drag-bars rise and fall. In their lateral movements the bars G turn in the tubes F, and are secured therein by placing on their upper ends the arms or bars o, which are held down by a screw-nut at the end, the bar o forming a shoulder to rest upon the upper end of the tube F. The tubes F are secured to the frame C by brackets n bolted to the under side, as shown. The arms or bars o project back of the attachment of the cross-rod, and are then bent down, forming the bars p, which pass down at the side of each drag-bar, and through the plates or brackets q, provided with an opening to receive them. The two arms o are connected by the cross-rod t, one end of which passes through the stud r and is locked by the set-screw s; the other end of this rod is attached to the other arm o. By loosening the set-screw s each drag-bar d has a separate and independent movement, and by tightening it they are made to move together in any position to which they may be adjusted, as they can be set nearly together or farther apart by means of the rod t and set-screw s. The drag-bars D are moved to the right or left by the operator placing his feet on the foot-rests J, when the seat is high, or upon the foot-rests K, when the seat is low. If desired, handles may be applied to the drag-bars, and the machine used as a walking cultivator. By adding the bar p to the bar o, and extending it down and connecting it with the drag-bar, we get a bearing both in front and rear of the connecting-bar t, so as to insure easier lateral movements of the drag-bars, and without straining the connecting parts. This rear connection also prevents the drag-bars from spreading apart or crowding together, when the shovels are set at an angle. The plate q we have found to be the most convenient for connecting the bent bar p with the drag-bar, but it is obvious that a hole through the drag-bar, or a staple driven in the side thereof, would perform the same function.

What we claim as new, and desire to secure by Letters Patent, is as follows:

1. The combination of the levers H, provided with pins d and the spring b, with the curved standards I, provided with openings c on their sides, substantially as and for the purposes specified.

2. The bent bar p, in combination with the drag-bar D, shaft G, cylinder F, bar o, and cross-rod t, substantially as and for the purposes specified.

REUBEN ELLWOOD.
RICHARD L. PITCHER.

Witnesses:
HENRY M. AVERY,
E. F. DUTTON.